(12) United States Patent
Matsuda et al.

(10) Patent No.: US 12,241,803 B2
(45) Date of Patent: Mar. 4, 2025

(54) METHOD FOR MEASURING RESIDUAL STRESS

(71) Applicant: Kobe Steel, Ltd., Kobe (JP)

(72) Inventors: Mariko Matsuda, Takasago (JP);
Tatsuhiko Kabutomori, Takasago (JP);
Hiroyuki Takamatsu, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 287 days.

(21) Appl. No.: 18/000,464

(22) PCT Filed: Apr. 22, 2021

(86) PCT No.: PCT/JP2021/016328
§ 371 (c)(1),
(2) Date: Dec. 1, 2022

(87) PCT Pub. No.: WO2021/246080
PCT Pub. Date: Dec. 9, 2021

(65) Prior Publication Data
US 2023/0304876 A1    Sep. 28, 2023

(30) Foreign Application Priority Data

Jun. 2, 2020   (JP) ................................. 2020-096360

(51) Int. Cl.
*G01L 5/00*       (2006.01)
*G01L 1/25*       (2006.01)
(Continued)

(52) U.S. Cl.
CPC .............. *G01L 5/0047* (2013.01); *G01L 1/25* (2013.01); *G01N 23/2055* (2013.01);
(Continued)

(58) Field of Classification Search
CPC ..... G01L 5/0047; G01L 1/25; G01N 23/2055; G01N 23/205; G01N 2223/3303; G01N 2223/607
See application file for complete search history.

(56) References Cited

U.S. PATENT DOCUMENTS

| 2019/0094160 A1* | 3/2019 | Sunder ............ G01N 23/20016 |
| 2020/0072769 A1* | 3/2020 | Takamatsu ......... G01N 23/2055 |

FOREIGN PATENT DOCUMENTS

| EP | 3 070 447 A1 | 9/2016 |
| EP | 3 786 600 A1 | 3/2021 |

(Continued)

OTHER PUBLICATIONS

Extended European Search Report issued on Sep. 29, 2023 in European Patent Application No. 21818782.1, 9 pages.

*Primary Examiner* — Benjamin R Schmitt
(74) *Attorney, Agent, or Firm* — Oblon, McClelland, Maier & Neustadt, L.L.P.

(57) ABSTRACT

A method measuring a residual stress of a fillet portion, where an angle of incidence of X-rays denoted by $\Psi$ [°], a fillet radius denoted by R [mm], a fillet angle denoted by $\theta$ [°], a vertical width of a housing of an X-ray stress measuring apparatus denoted by W [mm], a width of a detection region of a two-dimensional detector denoted by D [mm], a complementary angle of a Bragg angle denoted by $\eta$ [°], and an interval between a flange portion and an imaginary straight line which passes through a fillet center and is parallel to the flange portion denoted by a [mm], formula 1 is satisfied; when $\Psi \geq 0$, an irradiation distance L [mm] of the X-rays, the irradiation distance L satisfies formula 2; and when $\Psi < 0$, the irradiation distance L satisfies formula 3.

$$D \leq W \qquad 1$$

(Continued)

$$\frac{-R(1-\cos\theta)+\frac{W}{2}\sin(\theta+\psi)}{\cos(\theta+\psi)} \leq L \leq \frac{D}{2\tan\eta} \quad \text{2}$$

$$\frac{R\sin\theta+\frac{W}{2}\cos(\theta+\psi)-a}{\sin(\theta+\psi)} \leq L \leq \frac{D}{2\tan\eta} \quad \text{3}$$

5 Claims, 10 Drawing Sheets

(51) Int. Cl.
  *G01N 23/2055* (2018.01)
  *G01N 23/205* (2018.01)
(52) U.S. Cl.
  CPC ... *G01N 23/205* (2013.01); *G01N 2223/3303* (2013.01); *G01N 2223/607* (2013.01)

(56) References Cited

FOREIGN PATENT DOCUMENTS

| | | |
|---|---|---|
| EP | 4 202 389 A1 | 6/2023 |
| JP | 5-72061 A | 3/1993 |
| WO | WO 2006/056647 A1 | 6/2006 |
| WO | WO-2019208061 A1 * 10/2019 | ............... G01L 1/25 |

* cited by examiner

METHOD FOR MEASURING RESIDUAL STRESS

TECHNICAL FIELD

The present invention relates to a method for measuring a residual stress.

BACKGROUND ART

Recently, a technique for measuring a residual stress using X-rays has been widely applied. In this technique, a lattice distortion occurring inside a specimen having a crystalline structure is measured using X-rays, and the measurement result is converted into a residual stress.

As a method for measuring a residual stress using X-rays, a cos $\alpha$ method is known. In the cos $\alpha$ method, a specimen is irradiated with X-rays at a specific angle of incidence, intensities of diffracted X-rays generated by reflection of the X-rays by the specimen are two-dimensionally detected, and a residual stress is measured based on a diffraction ring formed by an intensity distribution of the diffracted X-rays which have been detected (see Japanese Unexamined Patent Application, Publication No. H5-72061).

PRIOR ART DOCUMENTS

Patent Documents

Patent Document 1: Japanese Unexamined Patent Application, Publication No. H5-72061

SUMMARY OF THE INVENTION

Problems to be Solved by the Invention

In a case in which the angle of incidence of the X-rays is denoted by $\Psi$ [°], measurement accuracy of the cos $\alpha$ method is generally proportional to sin 2$\Psi$. Therefore, in the cos $\alpha$ method, the measurement accuracy decreases as the angle of incidence $\Psi$ of the X-rays on the specimen becomes further from 45°. For example, when the angle of incidence $\Psi$ of the X-rays is less than 15°, the measurement accuracy rapidly deteriorates. Furthermore, with an increase in the angle of incidence $\Psi$ of the X-rays, an influence of surface roughness of the specimen thereon is more likely to increase. Therefore, in the cos $\alpha$ method, the angle of incidence $\Psi$ of the X-rays on the specimen is set to typically greater than or equal to 15° and less than or equal to 65°, and preferably 35°.

However, with regard to a structure including: an axis portion having a cylindrical shape; and a flange portion (plate-shaped portion) protruding radially from the axis portion, wherein a fillet portion for alleviating stress concentration is provided in a connection portion between the axis portion and the flange portion, when a residual stress of the fillet portion is to be measured, it may be difficult to set the angle of incidence $\Psi$ to a desired value. That is to say, when the angle of incidence $\Psi$ of the X-rays is to be set to greater than or equal to 15° and less than or equal to 65°, a measuring apparatus may interfere with the specimen. In this case, conventionally, the residual stress has been measured in such a manner that the angle of incidence $\Psi$ of the X-rays is set to an appropriate angle falling outside the desired range. However, it is difficult to accurately measure the residual stress of the specimen by the conventional method.

The present invention was made in view of the foregoing circumstances, and an object of the present invention is to provide a method for measuring a residual stress, the method enabling measuring a residual stress of a fillet portion with high accuracy.

Means for Solving the Problems

One aspect of the present invention made to solve the foregoing problems is a method for measuring a residual stress of a fillet portion of a metallic structure, the metallic structure including: an axis portion; and a flange portion protruding radially from the axis portion, wherein the metallic structure includes the fillet portion in a connection portion between the axis portion and the flange portion, the method including: a calculating step of calculating the residual stress by a cos $\alpha$ method, by using an X-ray stress measuring apparatus including: an irradiation portion which delivers X-rays; a two-dimensional detector which detects a diffraction ring generated by Bragg diffraction of the X-rays delivered from the irradiation portion to the fillet portion; and a housing in which the irradiation portion and the two-dimensional detector are mounted, wherein in a case in which an angle of incidence of the X-rays is denoted by $\Psi$ [°], a fillet radius of the fillet portion is denoted by R [mm], a fillet angle of the fillet portion is denoted by $\theta$ [°], a vertical width of the housing is denoted by W [mm], a width of a detection region of the two-dimensional detector is denoted by D [mm], a complementary angle of a Bragg angle is denoted by $\eta$ [°], and an interval between the flange portion and an imaginary straight line which passes through a fillet center and is parallel to the flange portion is denoted by a [mm], the following formula 1 is satisfied:

$$D \leq W \quad\quad 1$$

in a case in which $\Psi \geq 0$, an irradiation distance L [mm] of the X-rays, the irradiation distance L being based on the two-dimensional detector in the calculating step, satisfies the following formula 2, and in a case in which $\Psi < 0$, the irradiation distance L in the calculating step satisfies the following formula 3, $$\frac{-R(1-\cos\theta) + \frac{W}{2}\sin(\theta+\psi)}{\cos(\theta+\psi)} \leq L \leq \frac{D}{2\tan\eta} \quad\quad 2$$

$$\frac{R\sin\theta + \frac{W}{2}\cos(\theta+\psi) - a}{\sin(\theta+\psi)} \leq L \leq \frac{D}{2\tan\eta} \quad\quad 3$$

wherein the angle of incidence $\Psi$ is positive in a case of tilting toward the axis portion with respect to an imaginary straight line which passes through a measurement site and the fillet center, and is negative in a case of tilting toward the flange portion.

According to the method for measuring a residual stress, in the case of measuring the residual stress of the fillet portion formed in the connection portion between the axis portion and the flange portion, the angle of incidence $\Psi$ of the X-rays can be brought close to a desired angle. Thus, according to the method for measuring a residual stress, the residual stress of the fillet portion can be measured with high accuracy.

In a case in which the fillet portion includes a plurality of regions having different diameters, a center of curvature and a radius of curvature of, among the plurality of regions, a region having a largest diameter are preferably defined as the fillet center and the fillet radius of the fillet portion. In the case in which the fillet portion includes the plurality of regions having different diameters, by thus defining the center of curvature and the radius of curvature of, among the plurality of regions, the region having the largest diameter as the fillet center and the fillet radius of the fillet portion, the residual stress of the fillet portion can be easily measured with high accuracy.

In the case in which the fillet portion includes a plurality of regions having different diameters, a center of curvature and a radius of curvature of, among the plurality of regions, a region having a longest arc are preferably defined as the fillet center and the fillet radius of the fillet portion. In the case in which the fillet portion includes the plurality of regions having different diameters, by thus defining the center of curvature and the radius of curvature of, among the plurality of regions, the region having the longest arc as the fillet center and the fillet radius of the fillet portion, the residual stress of the fillet portion can be easily measured with high accuracy.

The calculating step preferably includes: a step of disposing the X-ray stress measuring apparatus with respect to the fillet portion, by adjusting the irradiation distance L such that the angle of incidence Ψ approaches a set value within a range that satisfies the above formulae 1 to 3. The method for measuring a residual stress enables disposing the X-ray stress measuring apparatus at a desired position based on the above formulae 1 to 3, whereby the residual stress of the fillet portion can be easily measured with high accuracy.

The set value is preferably 35° or −35°. When the set value is the aforementioned value, the residual stress of the fillet portion can be easily measured with high accuracy.

It is to be noted that in the present invention, the "fillet center" as referred to herein means a center of curvature of the fillet portion. The "fillet radius of the fillet portion" as referred to herein means a radius of curvature of the fillet portion. The "fillet angle of the fillet portion" as referred to herein means an angle in a side view, formed between an imaginary straight line (see an imaginary straight line V in FIG. 1) which passes through the fillet center and is orthogonal to the axis portion, and an imaginary straight line (see an imaginary straight line N in FIG. 1) which passes through the measurement site and the fillet center. The "vertical width of the housing" as referred to herein means a maximum value of a width (see a width W in FIG. 1) between a surface (see a lower surface 3a in FIG. 1) of the housing, the surface being on a side adjacent to the axis portion, and a surface (see an upper surface 3b in FIG. 1) facing this surface and being on a side adjacent to the flange portion. The "interval between the flange portion and the imaginary straight line which passes through the fillet center and is parallel to the flange portion" as referred to herein means an average value of intervals at 5 arbitrary points between the imaginary straight line and the flange portion (excluding the fillet portion). The "detection region of the two-dimensional detector" as referred to herein means a region in which the diffraction ring is detectable in the two-dimensional detector.

Effects of the Invention

As described above, the method for measuring a residual stress according to the one aspect of the present invention enables measuring the residual stress of the fillet portion with high accuracy.

DESCRIPTION OF EMBODIMENTS

Hereinafter, embodiments of the present invention are described in detail with reference to the drawings.

Method for Measuring Residual Stress

Figure 1:
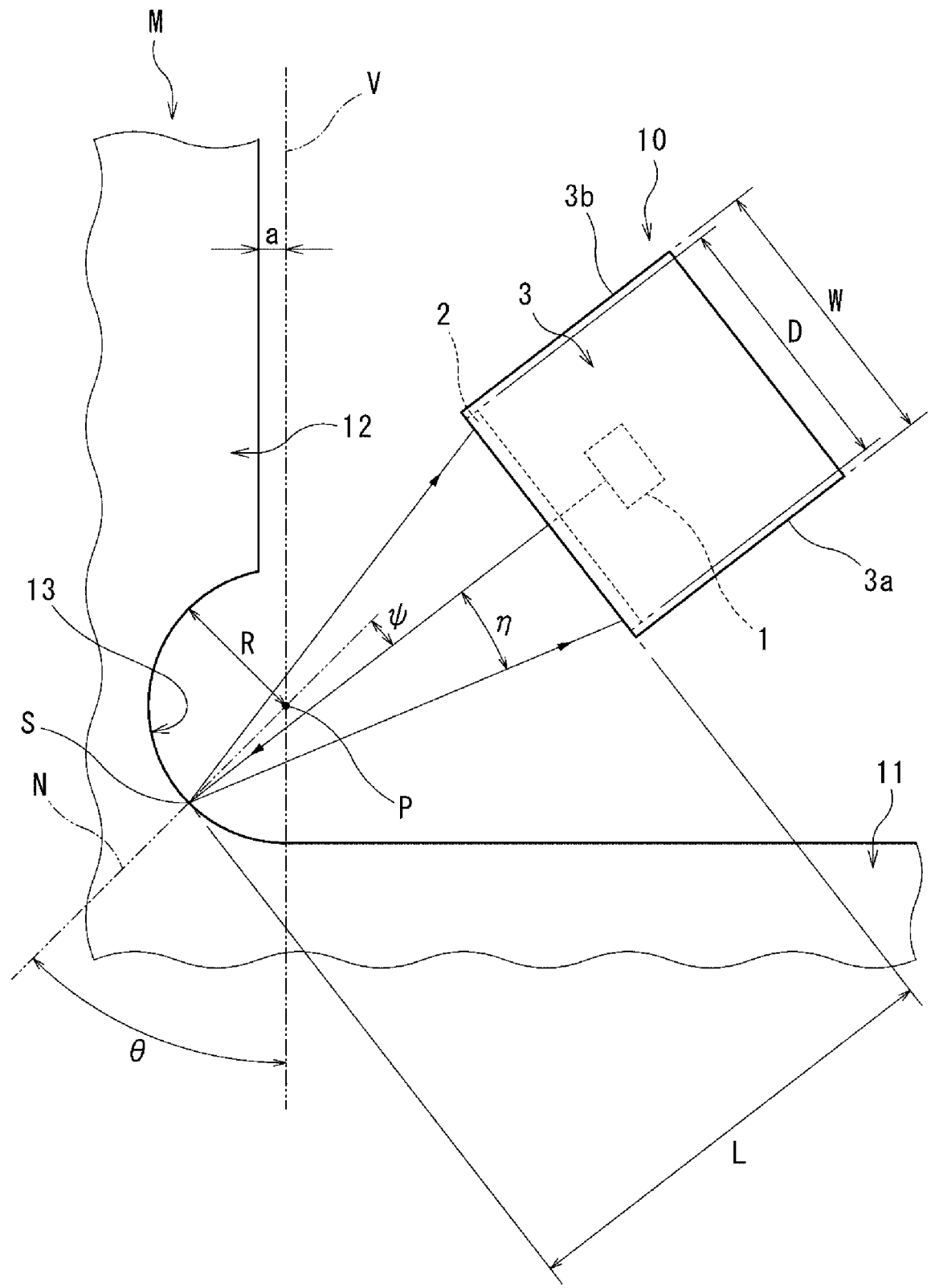
FIG. 1 is a schematic side view illustrating a state in which the residual stress of the fillet portion is measured by a method for measuring a residual stress according to one embodiment of the present invention.

As illustrated in FIG. 1, the method for measuring a residual stress is a method for measuring a residual stress of a fillet portion 13 of a metallic structure M, the metallic structure M including: an axis portion 11; and a flange portion 12 protruding radially from the axis portion 11, wherein the metallic structure M includes the fillet portion 13 in a connection portion between the axis portion 11 and the flange portion 12. The flange portion 12 protrudes in a direction perpendicular to a central axis of the axis portion 11. The method for measuring a residual stress includes a step (calculating step) of calculating the residual stress by the cos α method, by using an X-ray stress measuring apparatus 10 including: an irradiation portion 1 which delivers X-rays; a two-dimensional detector 2 which detects a diffraction ring generated by Bragg diffraction of the X-rays delivered from the irradiation portion 1 to the fillet portion 13; and a housing 3 in which the irradiation portion 1 and the two-dimensional detector 2 are mounted.

The X-ray stress measuring apparatus 10 is configured to enable detecting the diffraction ring by irradiating the metallic structure M with the X-rays. The housing 3 has, for example, a generally rectangular parallelepiped shape. The housing 3 has: the lower surface 3a adjacent to the axis portion 11; and the upper surface 3b facing the lower surface 3a and being adjacent to the flange portion 12. In the housing 3, the lower surface 3a approaches the axis portion 11 when the angle of incidence Ψ shifts to a positive side, and the upper surface 3b approaches the flange portion 12 when the angle of incidence Ψ shifts to a negative side. The two-dimensional detector 2 is provided at an end on an X-ray emission surface side of the housing 3. That is to say, the two-dimensional detector 2 is provided at an end on a side facing a measurement site S. A calculator (not illustrated) capable of using the diffraction ring to calculate the residual stress by the cos α method is connected to the housing 3. The two-dimensional detector 2 is exemplified by an imaging plate.

In the method for measuring a residual stress, in a case in which the angle of incidence of the X-rays is denoted by $\Psi$ [°], a fillet radius of the fillet portion 13 is denoted by R [mm], a fillet angle of the fillet portion 13 is denoted by θ [°], a vertical width of the housing 3 is denoted by W [mm], a width of a detection region of the two-dimensional detector 2 is denoted by D [mm], a complementary angle of a Bragg angle is denoted by η [°], and an interval between the flange portion 12 and the imaginary straight line V which passes through a fillet center P and is parallel to the flange portion 12 is denoted by a [mm], the following formula 1 is satisfied.

$$D \leq W \qquad 1$$

In the method for measuring a residual stress, the residual stress of the fillet portion 13 is measured by capturing an image of an entirety or a part of the diffraction ring on the two-dimensional detector 2. Therefore, as shown in the above formula 1, the width D of the detection region of the two-dimensional detector 2 needs to be less than or equal to the vertical width W of the housing 3. It is to be noted that the "width of the detection region of the two-dimensional detector" as referred to herein more specifically means the width of the detection region of the two-dimensional detector in a vertical direction of the housing (i.e., a vertical width of the detection region of the two-dimensional detector).

Furthermore, in the method for measuring a residual stress, in a case in which $\Psi \geq 0$, an irradiation distance L [mm] of the X-rays, the irradiation distance L being based on the two-dimensional detector 2 in the calculating step, satisfies the following formula 2.

$$\frac{-R(1-\cos\theta) + \frac{W}{2}\sin(\theta+\psi)}{\cos(\theta+\psi)} \leq L \leq \frac{D}{2\tan\eta} \qquad 2$$

Moreover, in the method for measuring a residual stress, in a case in which $\Psi<0$, the irradiation distance L [mm] of the X-rays, the irradiation distance L being based on the two-dimensional detector 2 in the calculating step, satisfies the following formula 3.

$$\frac{R\sin\theta + \frac{W}{2}\cos(\theta+\psi) - a}{\sin(\theta+\psi)} \leq L \leq \frac{D}{2\tan\eta} \qquad 3$$

It is to be noted that the angle of incidence $\Psi$ of the X-rays refers to an angle formed between the X-rays and the imaginary straight line N which passes through the measurement site S and the fillet center P. Furthermore, with respect to the imaginary straight line N which passes through the measurement site S and the fillet center P, the angle of incidence $\Psi$ is positive in a case of tilting toward the axis portion 11, and is negative in a case of tilting toward the flange portion 12.

In the method for measuring a residual stress, when the irradiation distance L of the X-rays is excessively small, in a case in which the housing 3 is tilted such that the angle of incidence $\Psi$ of the X-rays has a desired value, the housing 3 may interfere with the axis portion 11 or the flange portion 12. On the other hand, in the method for measuring a residual stress, by increasing the irradiation distance L of the X-rays, the angle of incidence $\Psi$ of the X-rays can be set to fall within a relatively large range. However, in this case, when the irradiation distance L of the X-rays is excessively increased, the two-dimensional detector 2 cannot detect peaks of X-rays diffracted at a diffraction angle η.

In light of this, in the case of tilting the housing 3 toward the axis portion 11 with respect to the imaginary straight line N which passes through the measurement site S and the fillet center P (i.e., in the case in which the angle of incidence $\Psi$ of the X-rays is positive), the lower limit value of the irradiation distance L of the X-rays is represented by the following formula 4 according to the condition that the housing 3 is not in contact with the axis portion 11, and the upper limit value of the irradiation distance L of the X-rays is represented by the following formula 5 according to the condition that the peaks of the diffraction ring are detectable with the two-dimensional detector 2.

$$L = \frac{-R(1-\cos\theta) + \frac{W}{2}\sin(\theta+\psi)}{\cos(\theta+\psi)} \qquad 4$$

$$L = \frac{D}{2\tan\eta} \qquad 5$$

On the other hand, in the case of tilting the housing 3 toward the flange portion 12 with respect to the imaginary straight line N which passes through the measurement site S and the fillet center P (i.e., in the case in which the angle of incidence $\Psi$ of the X-rays is negative), the lower limit value of the irradiation distance L of the X-rays is represented by the following formula 6 according to the condition that the housing 3 is not in contact with the flange portion 12, and the upper limit value of the irradiation distance L of the X-rays is represented by the following formula 7 according to the condition that the peaks of the diffraction ring are detectable with the two-dimensional detector 2.

$$L = \frac{R\sin\theta + \frac{W}{2}\cos(\theta+\psi) - a}{\sin(\theta+\psi)} \qquad 6$$

$$L = \frac{D}{2\tan\eta} \qquad 7$$

Measurement Conditions

Measurement conditions in the method for measuring a residual stress are described with reference to FIGS. 2 to 5.

Irradiation Distance

Figure 2:
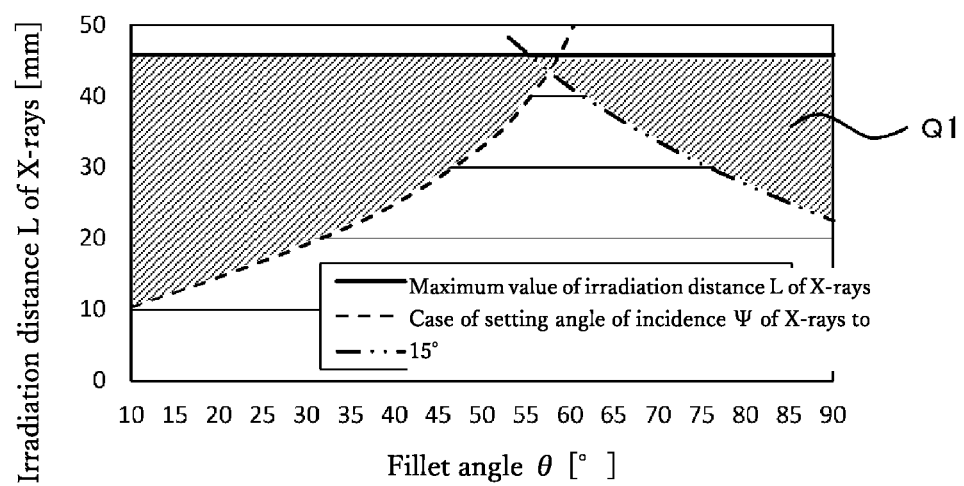
FIG. 2 is a graph illustrating a relationship between the irradiation distance of the X-rays and the fillet angle of the fillet portion in the method for measuring a residual stress according to the one embodiment of the present invention.

Firstly, a possible range of the irradiation distance L of the X-rays in the method for measuring a residual stress is described with reference to FIGS. 2 and 3. In general, in the cos α method, when the angle of incidence $\Psi$ of the X-rays on the measurement site S is less than ±15° (i.e., greater than −15° and less than +15°), the measurement accuracy rapidly deteriorates. Therefore, in FIGS. 2 and 3, the irradiation distance L of the X-rays obtained using the above formulae 1 to 3 in the case in which the angle of incidence Ψ of the X-rays is set to ±15° is described. FIG. 2 illustrates a possible range Q1 of the irradiation distance L of the X-rays in relation to the fillet angle θ, in a case in which the fillet radius R of the fillet portion 13 is 18 mm, the vertical width W of the housing 3 is 44 mm, the width D of the detection region of the two-dimensional detector 2 is 40 mm, the interval a between the flange portion 12 and the imaginary straight line V which passes through the fillet center P and is parallel to the flange portion 12 is 2 mm, and the complementary angle η of the Bragg angle is 23.6°. Furthermore, FIG. 3 illustrates a possible range Q2 of the irradiation distance L of the X-rays in relation to the fillet radius R, in a case in which with regard to FIG. 2, the fillet angle θ is 60° and the fillet radius R is variable.

In FIG. 2, in a case in which the fillet angle θ of the fillet portion 13 is 57°, the possible range Q1 of the irradiation distance L of the X-rays is most limited. FIG. 2 indicates that in a case in which the fillet angle θ is less than or equal to 57°, the housing 3 is preferably tilted toward the axis portion 11 such that the angle of incidence Ψ of the X-rays becomes positive. Furthermore, it is found that in a case in which the fillet angle θ is greater than 57°, the housing 3 is preferably tilted toward the flange portion 12 such that the angle of incidence Ψ of the X-rays becomes negative.

Figure 3:
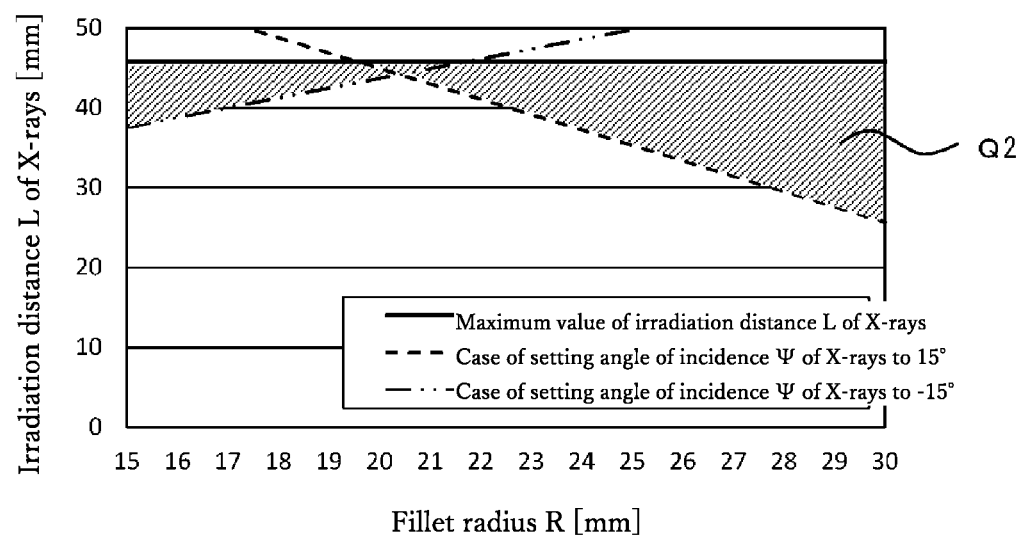
FIG. 3 is a graph illustrating a relationship between the irradiation distance of the X-rays and the fillet radius of the fillet portion in the method for measuring a residual stress according to the one embodiment of the present invention.

In FIG. 3, in a case in which the fillet radius R of the fillet portion 13 is 21 mm, the possible range Q2 of the irradiation distance L of the X-rays is most limited. FIG. 3 indicates that in a case in which the fillet radius R is less than or equal to 21 mm, the housing 3 is preferably tilted toward the flange portion 12 such that the angle of incidence Ψ of the X-rays becomes negative. Furthermore, it is found that in a case in which the fillet radius R is greater than 21 mm, the housing 3 is preferably tilted toward the axis portion 11 such that the angle of incidence Ψ of the X-rays becomes positive.

Vertical Width of Housing

Figure 4:
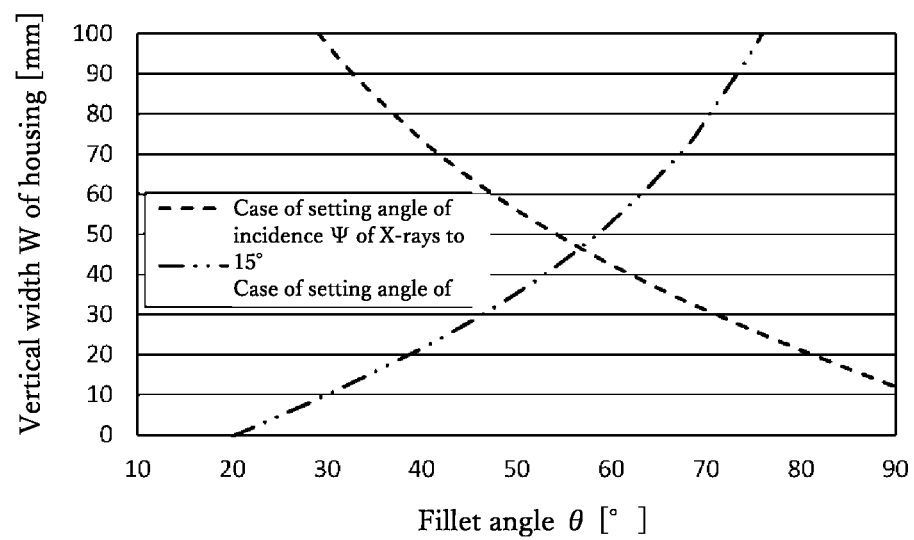
FIG. 4 is a graph illustrating a relationship between the vertical width of the housing and the fillet angle of the fillet portion in the method for measuring a residual stress according to the one embodiment of the present invention.

A possible range of the vertical width W of the housing 3 in the method for measuring a residual stress is described with reference to FIGS. 4 and 5. FIG. 4 illustrates the possible range of the vertical width W of the housing 3 in relation to the fillet angle θ, in a case in which conditions are similar to those in FIG. 2 except for the vertical width W of the housing 3 and the irradiation distance L of the X-rays is set to the maximum value. Furthermore, FIG. 5 illustrates the possible range of the vertical width W of the housing 3 in relation to the fillet radius R, in a case in which with regard to FIG. 4, the fillet angle θ is 60° and the fillet radius R is variable.

In FIG. 4, in the case in which the fillet angle θ of the fillet portion 13 is 57°, the possible range of the vertical width W of the housing 3 is most limited. FIG. 4 indicates that in the case in which the fillet angle θ is less than or equal to 57°, tilting the housing 3 toward the axis portion 11 enables measuring under desired conditions even in the case in which the vertical width W of the housing 3 is relatively large. Furthermore, it is found that in the case in which the fillet angle θ is greater than 57°, tilting the housing 3 toward the flange portion 12 enables measuring under desired conditions even in the case in which the vertical width W of the housing 3 is relatively large.

Figure 5:
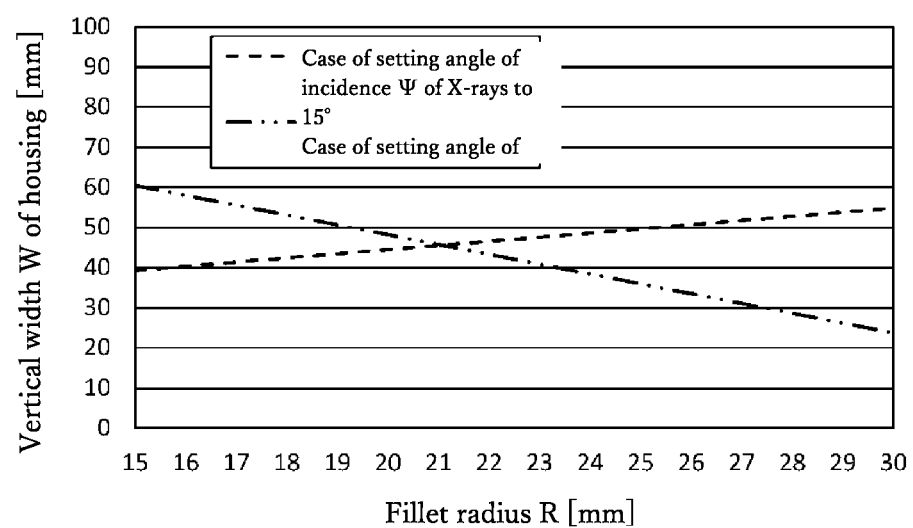
FIG. 5 is a graph illustrating a relationship between the vertical width of the housing and the fillet radius of the fillet portion in the method for measuring a residual stress according to the one embodiment of the present invention.

In FIG. 5, in the case in which the fillet radius R of the fillet portion 13 is 21 mm, the possible range of the vertical width W of the housing 3 is most limited. FIG. 5 indicates that in the case in which the fillet radius R is less than or equal to 21 mm, tilting the housing 3 toward the flange portion 12 enables measuring under desired conditions even in the case in which the vertical width W of the housing 3 is relatively large. Furthermore, it is found that in the case in which the fillet radius R is greater than 21 mm, tilting the housing 3 toward the axis portion 11 enables measuring under desired conditions even in the case in which the vertical width W of the housing 3 is relatively large.

Settings of Fillet Center and Fillet Radius

Figure 6:
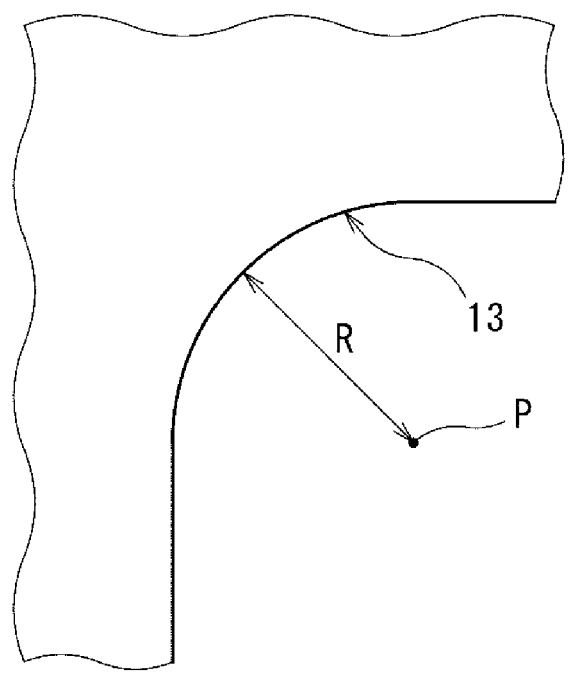
FIG. 6 is a schematic view for describing a procedure for defining the fillet center and the fillet radius.

As illustrated in FIG. 6, in the method for measuring a residual stress, in a case in which the curvature of the fillet portion 13 is constant, the fillet center P and the fillet radius R are set to correspond to the curvature. On the other hand, a plurality of regions having different diameters may be present in the fillet portion 13. An example of a method for setting the fillet center and the fillet radius in the case in which the plurality of regions having different diameters are present in the fillet portion is described with reference to FIGS. 7 and 8.

Figure 7:
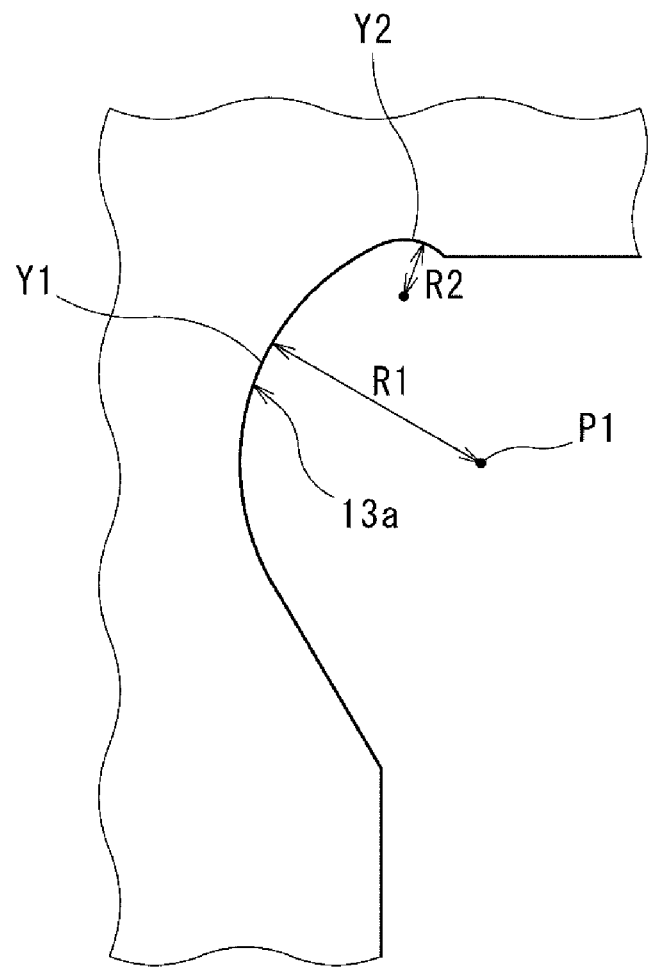
FIG. 7 is a schematic view for describing a procedure for defining the fillet center and the fillet radius, the procedure being different from that in FIG. 6.

A fillet portion 13a in FIG. 7 includes: a first region Y1 having a first radius of curvature R1; and a second region Y2 having a second radius of curvature R2 which is smaller than the first radius of curvature R1. In this case, a center of curvature P1 and the radius of curvature R1 of the first region Y1 having the largest radius of curvature can be defined as a fillet center and a fillet radius of the fillet portion 13a. By thus defining the fillet center and the fillet radius of the fillet portion 13a, a residual stress of the fillet portion 13a can be easily measured with high accuracy.

Figure 8:
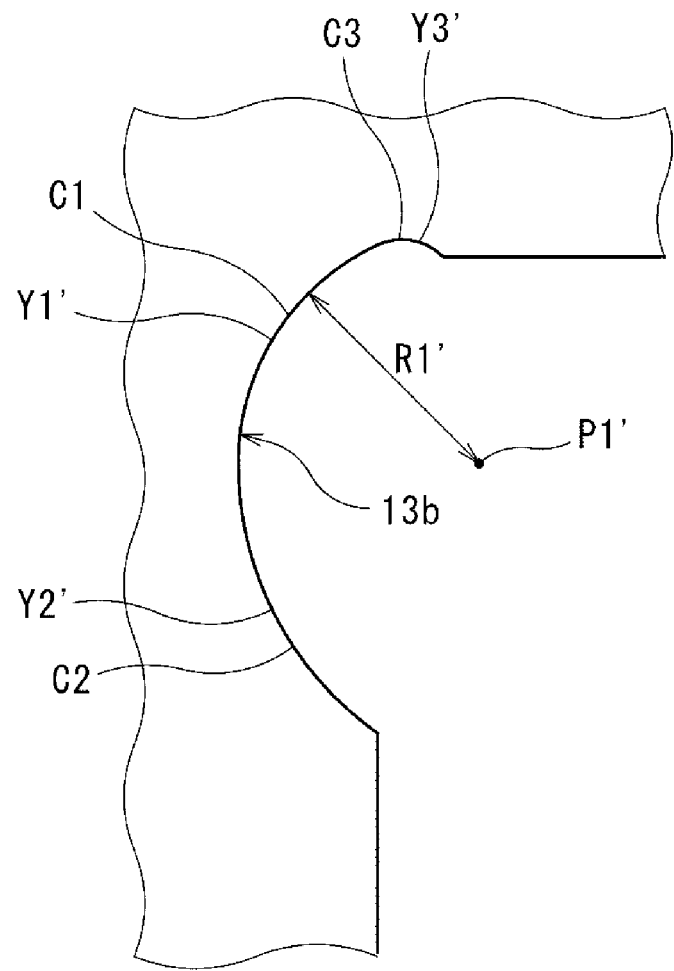
FIG. 8 is a schematic view for describing a procedure for defining the fillet center and the fillet radius, the procedure being different from those in FIGS. 6 and 7.

A fillet portion 13b in FIG. 8 includes: a first region Y1' having a first arc C1; a second region Y2' having a second arc C2 which is shorter than the first arc; and a third region Y3' having a third arc C3 which is shorter than the second arc C2. In this case, a center of curvature P1' and a radius of curvature R1' of the first region Y1' having the longest arc can be defined as a fillet center and a fillet radius of the fillet portion 13b. By thus defining the fillet center and the fillet radius of the fillet portion 13b, a residual stress of the fillet portion 13b can be easily measured with high accuracy.

Measurement of Residual Stress

The calculating step preferably includes a step (disposing step) of disposing the X-ray stress measuring apparatus 10 with respect to the fillet portion 13, 13a, or 13b by adjusting the irradiation distance L of the X-rays such that the angle of incidence Ψ of the X-rays approaches a set value within a range that satisfies the above formulae 1 to 3. That is to say, the calculating step preferably includes: a step (deriving step) of deriving, by using the above formulae 1 to 3, conditions for disposing the X-ray stress measuring apparatus 10; a step (disposing step) of disposing the X-ray stress measuring apparatus 10 with respect to the fillet portion 13, 13a, or 13b based on the conditions derived in the deriving step; and a step (residual stress-calculating step) of calculating the residual stress of the fillet portion 13, 13a, or 13b in the disposition in the disposing step, wherein in the disposing step, the X-ray stress measuring apparatus 10 is disposed with respect to the fillet portion 13, 13a, or 13b by adjusting the irradiation distance L of the X-rays such that the angle of incidence Ψ of the X-rays approaches the set value within the range that satisfies the above formulae 1 to 3. In the disposing step, for example, a tilt direction of the housing 3 and the irradiation distance L of the X-rays are adjusted such that the angle of incidence Ψ of the X-rays approaches the set value. When the calculating step includes the above-described disposing step, the method for measuring a residual stress enables easily measuring, with high accuracy, the residual stress of the fillet portion 13, 13a, or 13b.

The set value in the disposing step is preferably 35° or −35°. According to this configuration, the residual stress of the fillet portion 13, 13a, or 13b can be measured with higher accuracy.

In the deriving step, conditions that satisfy the set value are preferably derived as the conditions for disposing the X-ray stress measuring apparatus 10. However, a case in which the conditions that satisfy the set value cannot be derived in the deriving step depending on a shape of the fillet portion 13, 13a, or 13b may be conceivable. In such a case in which the conditions that satisfy the set value cannot be derived in the deriving step, the method for measuring a residual stress has remarkable superiority to a conventional measurement method in which the disposition of the X-ray stress measuring apparatus 10 has been decided by feeling. In the method for measuring a residual stress, for example, the angle of incidence Ψ of the X-rays derived in the deriving step may fall within ±30° (i.e., greater than or equal to −30° and less than or equal to 30°), and may fall within ±15° (i.e., greater than or equal to −15° and less than or equal to 15°). Even in such a case, the method for measuring a residual stress enables easily measuring, with high accuracy, the residual stress of the fillet portion 13, 13a, or 13b as compared with the conventional measurement method.

Advantages

According to the method for measuring a residual stress, in the case of measuring the residual stress of the fillet portion 13, 13a, or 13b formed in the connection portion between the axis portion 11 and the flange portion 12, the angle of incidence Ψ of the X-rays can be brought close to a desired angle. Thus, according to the method for measuring a residual stress, the residual stress of the fillet portion 13, 13a, or 13b can be measured with high accuracy.

Other Embodiments

The above-described embodiments do not limit the configuration of the present invention. Therefore, in the above-described embodiments, the components of each part of the above-described embodiments can be omitted, replaced, or added based on the description in the present specification and general technical knowledge, and such omission, replacement, or addition should be construed as falling within the scope of the present invention.

In the method for measuring a residual stress, in the case in which the fillet portion includes the plurality of regions having different diameters, for example, the fillet center and the fillet radius may be determined for each measurement site.

EXAMPLES

Hereinafter, the present invention is described in detail by way of Examples; the present invention should not be construed as being limited to description in the Examples.

By using an X-ray stress measuring apparatus in which the width D of a detection region of a two-dimensional detector is 70 mm and the vertical width of a housing is 102 mm, the residual stress of a fillet portion of a metallic structure including an axis portion and a flange portion protruding radially from the axis portion was measured by the cos α method. The fillet radius R of the fillet portion was 29 mm, the complementary angle η of the Bragg angle was 23.6°, and the interval a between the flange portion and the imaginary straight line which passes through the fillet center and is parallel to the flange portion was 8 mm.

Comparative Examples

Figure 9:
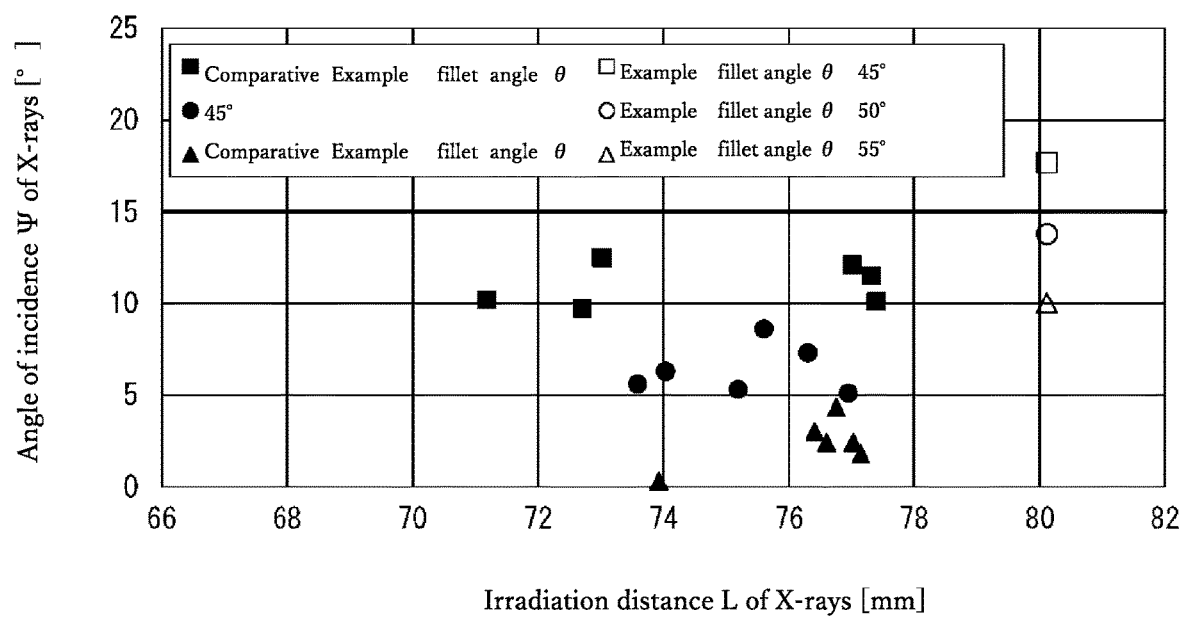
FIG. 9 is a graph illustrating a relationship between the angle of incidence of the X-rays and the irradiation distance of the X-rays in Examples and Comparative Examples.

While visually confirming that the housing did not come in contact with the axis portion or the flange portion, the X-ray stress measuring apparatus was disposed such that the angle of incidence Ψ of the X-rays was as large as possible. In the Comparative Examples, the residual stress of the fillet portion was measured by, in each of cases of the fillet angle θ of the fillet portion being 45°, 50°, and 55°, changing the disposition of the X-ray stress measuring apparatus 6 times. FIG. 9 illustrates the relationship between the angle of incidence Ψ of the X-rays and the irradiation distance L of the X-rays in the Comparative Examples. Furthermore, FIG. 10 illustrates the maximum value of the angle of incidence Ψ of the X-rays for each fillet angle θ.

Examples

For each of the cases of the fillet angle θ being 45°, 50°, and 55°, the disposition of the X-ray stress measuring apparatus was decided using the above formulae 1 to 3. In the Examples, by using the above formulae 1 to 3, the disposition of the X-ray stress measuring apparatus was decided such that the angle of incidence Ψ of the X-rays approached ±35°. In the Examples, in each of the cases of the fillet angle θ being 45°, 50°, and 55°, the housing was tilted toward the axis portion with respect to the imaginary straight line which passes through the measurement site and the fillet center. FIG. 9 illustrates the relationship between the angle of incidence Ψ of the X-rays and the irradiation distance L of the X-rays in the Examples. Furthermore, FIG. 10 illustrates the angle of incidence Ψ of the X-rays for each fillet angle θ.

Figure 10:
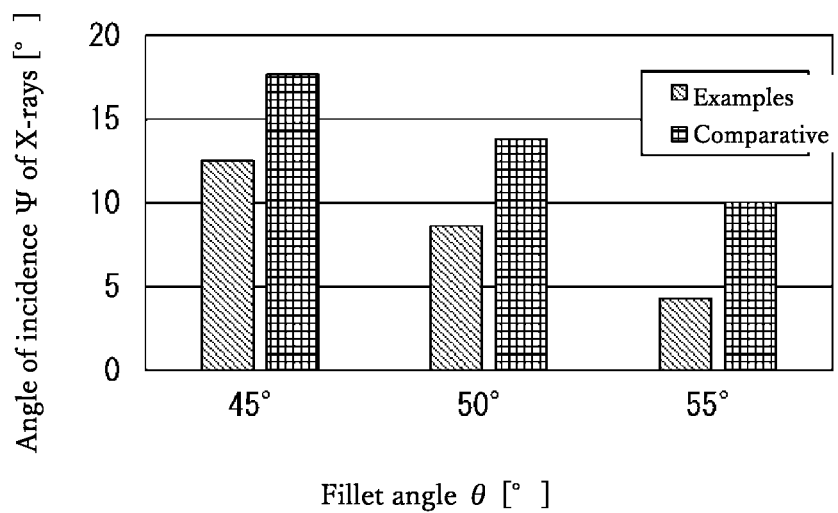
FIG. 10 is a graph illustrating maximum values of the angle of incidence of the X-rays for each fillet angle in the Examples and the Comparative Examples.

As illustrated in FIGS. 9 and 10, the angle of incidence Ψ of the X-rays in the Examples was able to be set to be larger than that in the Comparative Examples. This indicates that the residual stress of the fillet portion can be measured with high accuracy in the Examples as compared with the Comparative Examples.

INDUSTRIAL APPLICABILITY

As described above, the method for measuring a residual stress according to the one aspect of the present invention is suitable for measuring the residual stress of the fillet portion.

EXPLANATION OF THE REFERENCE SYMBOLS

1 Irradiation portion
2 Two-dimensional detector
3 Housing
3a Lower surface
3b Upper surface
10 X-ray stress measuring apparatus
11 Axis portion
12 Flange portion
13, 13a, 13b Fillet portion
a Interval between flange portion and imaginary straight line which passes through fillet center and is parallel to flange portion
C1 First arc
C2 Second arc
C3 Third arc
D Width of detection region of two-dimensional detector
L Irradiation distance of X-rays
M Metallic structure N Imaginary straight line which passes through measurement site and fillet center
P Fillet center
P1, P1' Center of curvature
Q1, Q2 Possible range of irradiation distance of X-rays
R Fillet radius
R1 First radius of curvature
R1' Radius of curvature
R2 Second radius of curvature
S Measurement site
V Imaginary straight line which passes through fillet center and is parallel to flange portion
W Vertical width of housing
Y1, Y1' First region
Y2, Y2' Second region
Y3' Third region
θ Fillet angle
Ψ Angle of incidence of X-rays
η Complementary angle of Bragg angle

The invention claimed is:

1. A method for measuring a residual stress of a fillet portion of a metallic structure, the metallic structure comprising:
an axis portion; and
a flange portion protruding radially from the axis portion,
wherein the metallic structure comprises the fillet portion in a connection portion between the axis portion and the flange portion,
the method comprising:
calculating the residual stress by a cos α method, by using an X-ray stress measuring apparatus comprising:
an irradiation portion which delivers X-rays;
a two-dimensional detector which detects a diffraction ring generated by Bragg diffraction of the X-rays delivered from the irradiation portion to the fillet portion; and
a housing in which the irradiation portion and the two-dimensional detector are mounted,
wherein
in a case in which an angle of incidence of the X-rays is denoted by Ψ [°], a fillet radius of the fillet portion is denoted by R [mm], a fillet angle of the fillet portion is denoted by θ [°], a vertical width of the housing is denoted by W [mm], a width of a detection region of the two-dimensional detector is denoted by D [mm], a complementary angle of a Bragg angle is denoted by η [°], and an interval between the flange portion and an imaginary straight line which passes through a fillet center and is parallel to the flange portion is denoted by a [mm], formula 1 is satisfied:

$$D \leq W \quad \quad 1$$

in a case in which Ψ≥0, an irradiation distance L [mm] of the X-rays, the irradiation distance L being based on the two-dimensional detector in the calculating, satisfies formula 2, and
in a case in which Ψ<0, the irradiation distance L in the calculating satisfies formula 3, $$\frac{-R(1-\cos\theta) + \frac{W}{2}\sin(\theta+\psi)}{\cos(\theta+\psi)} \leq L \leq \frac{D}{2\tan\eta} \quad \quad 2$$

$$\frac{R\sin\theta + \frac{W}{2}\cos(\theta+\psi) - a}{\sin(\theta+\psi)} \leq L \leq \frac{D}{2\tan\eta} \quad \quad 3$$

wherein with respect to an imaginary straight line which passes through a measurement site and the fillet center, the angle of incidence Ψ is positive in a case of tilting toward the axis portion, and is negative in a case of tilting toward the flange portion.

2. The method for measuring a residual stress according to claim 1, wherein in a case in which the fillet portion comprises a plurality of regions having different diameters, a center of curvature and a radius of curvature of, among the plurality of regions, a region having a largest diameter are defined as the fillet center and the fillet radius of the fillet portion.

3. The method for measuring a residual stress according to claim 1, wherein in a case in which the fillet portion comprises a plurality of regions having different diameters, a center of curvature and a radius of curvature of, among the plurality of regions, a region having a longest arc are defined as the fillet center and the fillet radius of the fillet portion.

4. The method for measuring a residual stress according to claim 1, wherein the calculating comprises:
disposing the X-ray stress measuring apparatus with respect to the fillet portion, by adjusting the irradiation distance L such that the angle of incidence Ψ approaches a set value within a range that satisfies the formulae 1 to 3.

5. The method for measuring a residual stress according to claim 4, wherein the set value is 35° or −35°.

* * * * *